US011540454B1

(12) United States Patent
Kowalski

(10) Patent No.: US 11,540,454 B1
(45) Date of Patent: Jan. 3, 2023

(54) FLOWER PROTECTOR

(71) Applicant: John R. Kowalski, Clovis, CA (US)

(72) Inventor: John R. Kowalski, Clovis, CA (US)

( * ) Notice: Subject to any disclaimer, the term of this patent is extended or adjusted under 35 U.S.C. 154(b) by 317 days.

(21) Appl. No.: 16/744,717

(22) Filed: Jan. 16, 2020

Related U.S. Application Data

(60) Provisional application No. 62/793,123, filed on Jan. 16, 2019.

(51) Int. Cl.
*A01G 13/04* (2006.01)

(52) U.S. Cl.
CPC .................................. *A01G 13/043* (2013.01)

(58) Field of Classification Search
USPC ... 47/41.14, 19.1, 20.1, 22.1, 29.1, 45, 29.5, 47/29.7, 30, 31.1, 32.3
See application file for complete search history.

(56) References Cited

U.S. PATENT DOCUMENTS

| | | | | |
|---|---|---|---|---|
| 1,803,626 A * | 5/1931 | Lasley | ................... | E04H 1/1244 135/128 |
| 2,701,539 A * | 2/1955 | Morel | ................... | B63B 21/243 114/305 |
| 4,501,099 A * | 2/1985 | Boaz | ......................... | A01G 9/16 52/82 |
| 4,838,878 A * | 6/1989 | Kalt | .......................... | F16L 3/08 128/DIG. 26 |
| 5,930,948 A * | 8/1999 | Daniel | ................... | A01G 13/10 47/23.1 |
| 6,014,837 A | 1/2000 | Morgan | | |
| 6,088,953 A * | 7/2000 | Morgan | ................ | A01G 13/043 47/20.1 |
| 6,250,320 B1 * | 6/2001 | Roth | .................... | E04H 12/2215 135/118 |
| 6,357,174 B1 * | 3/2002 | Hernick | ................... | A01G 9/12 47/45 |
| 8,161,680 B1 | 4/2012 | Sloan et al. | | |
| 9,067,725 B1 | 6/2015 | Sellers et al. | | |
| D735,885 S | 8/2015 | Wehner | | |
| D787,283 S | 5/2017 | Horvath | | |
| 9,894,847 B2 | 2/2018 | Cruz | | |
| 9,932,752 B1 | 4/2018 | Vila | | |
| 10,034,436 B2 * | 7/2018 | Legus | ....................... | A01G 9/12 |
| 10,130,048 B2 * | 11/2018 | Lipani | .................... | A01G 13/10 |
| 2007/0062109 A1 * | 3/2007 | Jolley | .................... | A01G 17/14 47/47 |
| 2012/0247011 A1 * | 10/2012 | Johnson | .................. | E04H 17/22 47/32.4 |
| 2014/0026475 A1 * | 1/2014 | Centeno | ................. | A01G 13/02 47/29.5 |
| 2015/0184378 A1 * | 7/2015 | Silva | ....................... | E04H 15/44 160/351 |
| 2020/0068846 A1 * | 3/2020 | Rolf | ........................ | A01K 31/06 |

FOREIGN PATENT DOCUMENTS

WO    WO 2009/051500    *    4/2009    ............. A01G 13/10

* cited by examiner

*Primary Examiner* — Andrea M Valenti
(74) *Attorney, Agent, or Firm* — Cramer Patent & Design, PLLC; Aaron R. Cramer

(57) ABSTRACT

A flower protector includes a tubular translucent shield having a ventilated topside face and a plurality of supporting base arms. A locking mechanism secures the shield in place. The shield is capable of being manipulated between a fully extended state and a fully collapsed state to effectively cover the foliage.

10 Claims, 4 Drawing Sheets

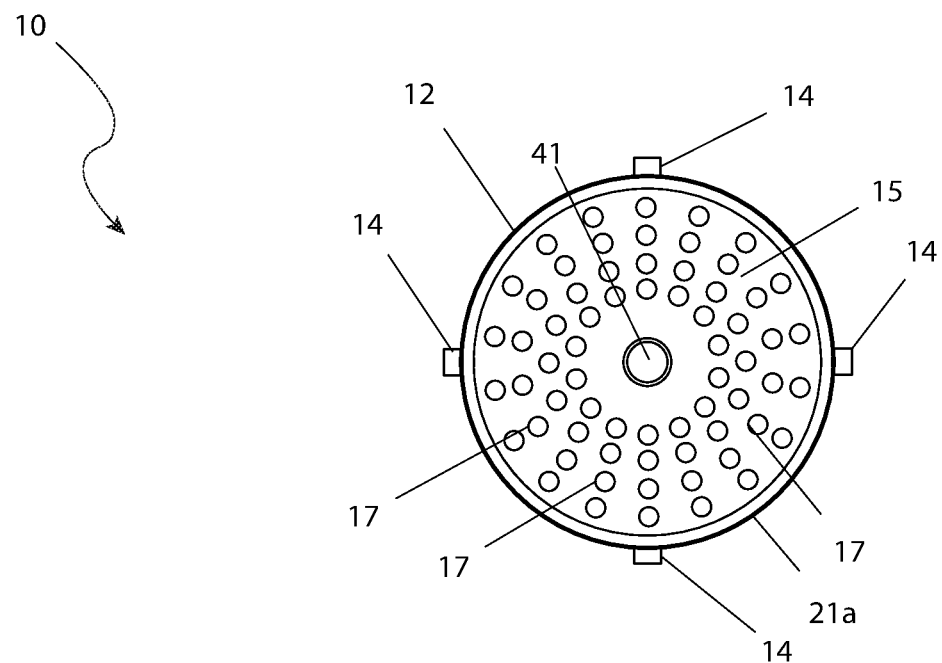
Fig. 4
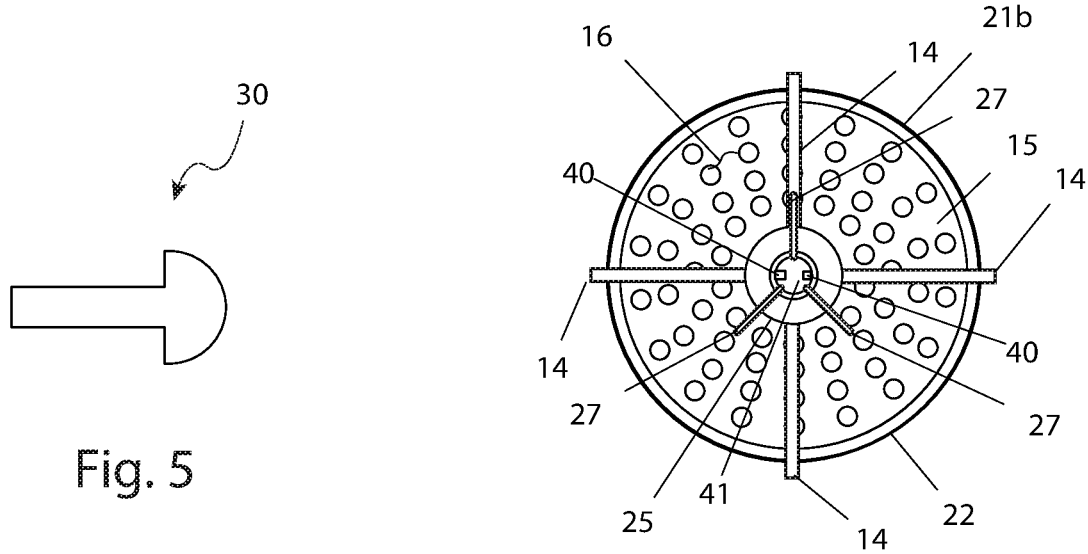
Fig. 5
Fig. 6

FLOWER PROTECTOR

RELATED APPLICATIONS

The present invention is a Continuation of and claims the benefit of U.S. Application No. 62/793,123, filed Jan. 16, 2019, the entire disclosures of which are incorporated herein by reference.

FIELD OF THE INVENTION

The present invention relates to a portable and deployable protector particularly suited for plants.

BACKGROUND OF THE INVENTION

Losing a loved one is heartbreaking, and it is common to visit the final resting place of the loved one. Among other places, a cemetery is a typical place where loved ones are finally laid to rest. When mourning the loss of a loved one in a cemetery, it is a common occurrence to bring mementos or flowers to the gravesite. When placing such items on or near the gravesite, it is desired to protect them from the elements, especially when the items are to be left there after the visit is over. Therefore, there is seen a need to provide a means to protect these items form the element, yet still provide a way to view the items. It is also a desire to have such a means be portable and easily deployed, but also be left in a deployed configuration when unattended and to protect from unauthorized removal.

BRIEF SUMMARY OF THE INVENTION

The principles of the present invention provide for a flower protector, which comprises a center post which has a first end and a second end, a sidewall which has a plurality of ribs that circumscribes the center post and is fully deployed and fully collapsed relative thereto, a key receiver which is located at the first end of the center post that is keyed or otherwise has a locking mechanism that is in mechanical communication with a pair of stops, a key which provides an authorized deployment of the locking mechanism and the pair of stops, a plurality of legs which are located at the second end of the center post, a lower frame which extends away from diametrically opposing sides of the second end of the center post, immediately superjacent from the legs, a lower perimeter frame which is attached to the lower frame, an upper perimeter frame which is attached to the opposing upper perimeter edge of the sidewall and wherein each of the ribs are disposed within each of a plurality of sleeves.

The center post may be cylindrical. The sidewall may be made of a flexible and resilient material. The sleeves may be interspersed within the sidewall or may be attached to either an inner surface. The sleeves may be interspersed within the sidewall or may be attached to or the outer surface of the sidewall. The pair of stops may be located adjacent the first end and project outwardly at diametrical opposing sides of the center post. The pair of stops retract within the locking mechanism within the center post when retracted.

The pair of stops may extend perpendicularly away from the center post when deployed. The operation of the key may provide selective and authorized deployment or retraction of the pair of stops. The pair of stops may prevent downward movement of the sidewall relative to the center post. The legs may be arranged in a tripod. The legs may each include a pointed end to penetrate the ground surface. The lower perimeter frame may be circular, transparent, and may circumscribe the center post. The sleeves may be permanently fastened to the sidewall. The sleeves may have a removable fastener to removably fasten them to the sidewall. The removable fastener may be a hook-and-loop-type fastener. The interior of each of the sleeves may be accessible where one of the ribs needs to be removed or replaced. The interior of each of the sleeves may be accessible with a removable fastener. Each of the sleeves may be affixed to the inner side of the sidewall and one of the ribs may be disposed therein. The sleeves and the ribs may be equidistantly spaced between each other and the upper perimeter frame and the lower perimeter frame.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 4 is a top plan view of the flower protector 10, according to the preferred embodiment of the present invention;

FIG. 5 is a side elevation view of a key 30, according to the preferred embodiment of the present invention; and, FIG. 6 is a bottom plan view of the flower protector 10, according to the preferred embodiment of the present invention.

Figure 1:
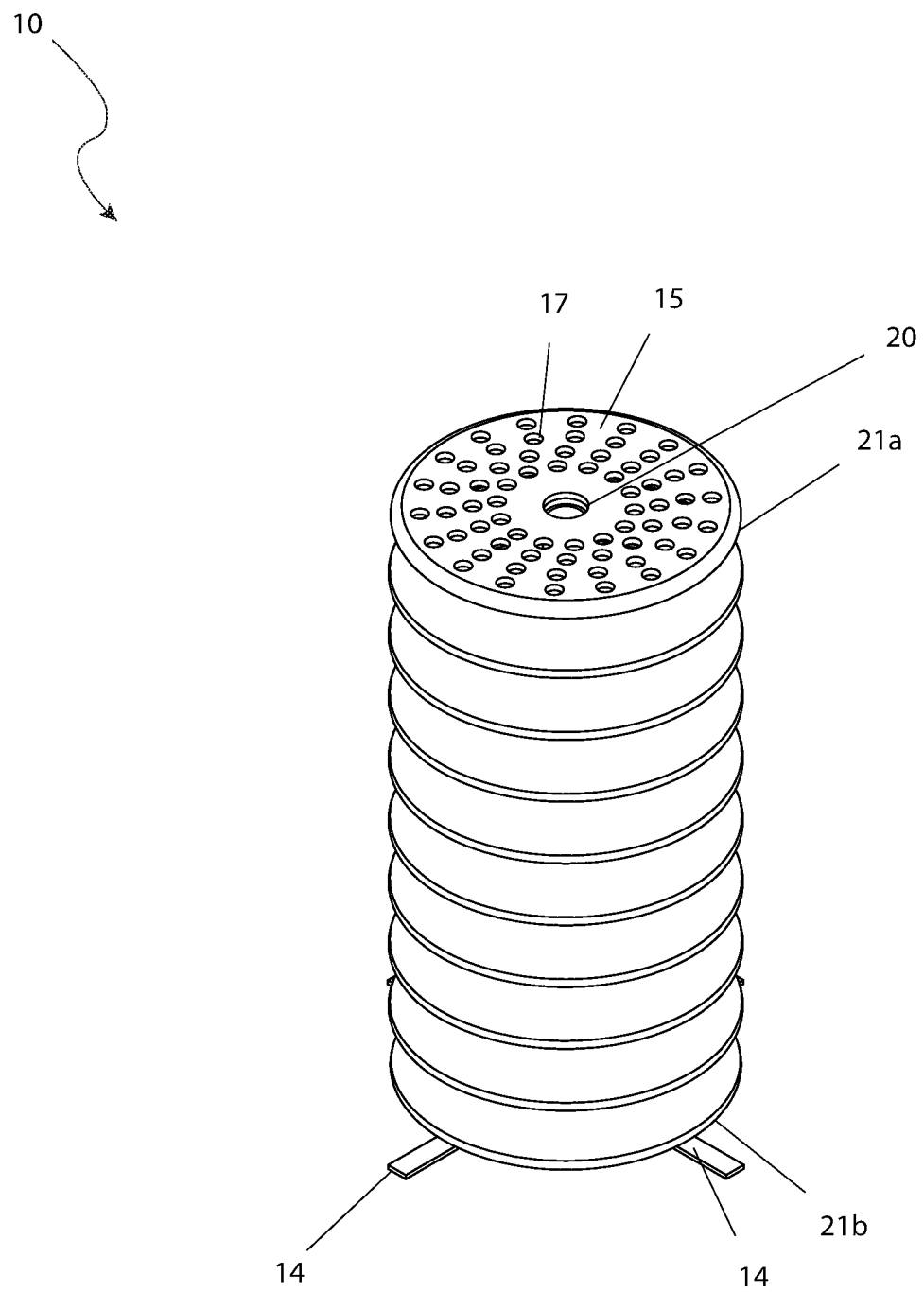
FIG. 1 is a front perspective view of a flower protector 10 in a fully extended configuration, according to the preferred embodiment of the present invention.

DESCRIPTIVE KEY 10 flower protector
12 rib
14 bottom frame
15 top wall
16 open bottom
17 aperture
20 key receiver
21a upper perimeter frame
21b lower perimeter frame
22 sidewall
23 sleeve
25 center post
27 leg
30 key
40 stop
41 locking mechanism 1. Description of the Invention The best mode for carrying out the invention is presented in terms of its preferred embodiment, herein depicted within FIG. 1 through 6. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

The present invention relates to a flower protector (herein described as the "protector") 10, particularly suited and configured to protect flowers or other mementos left at a gravesite in a cemetery from the elements. Although most commonly used to protect flowers, the protector 10 is capable of protecting any other memento or item left at a gravesite, or at any other location where the protection of the flowers or mementos are desired.

Figure 2A:
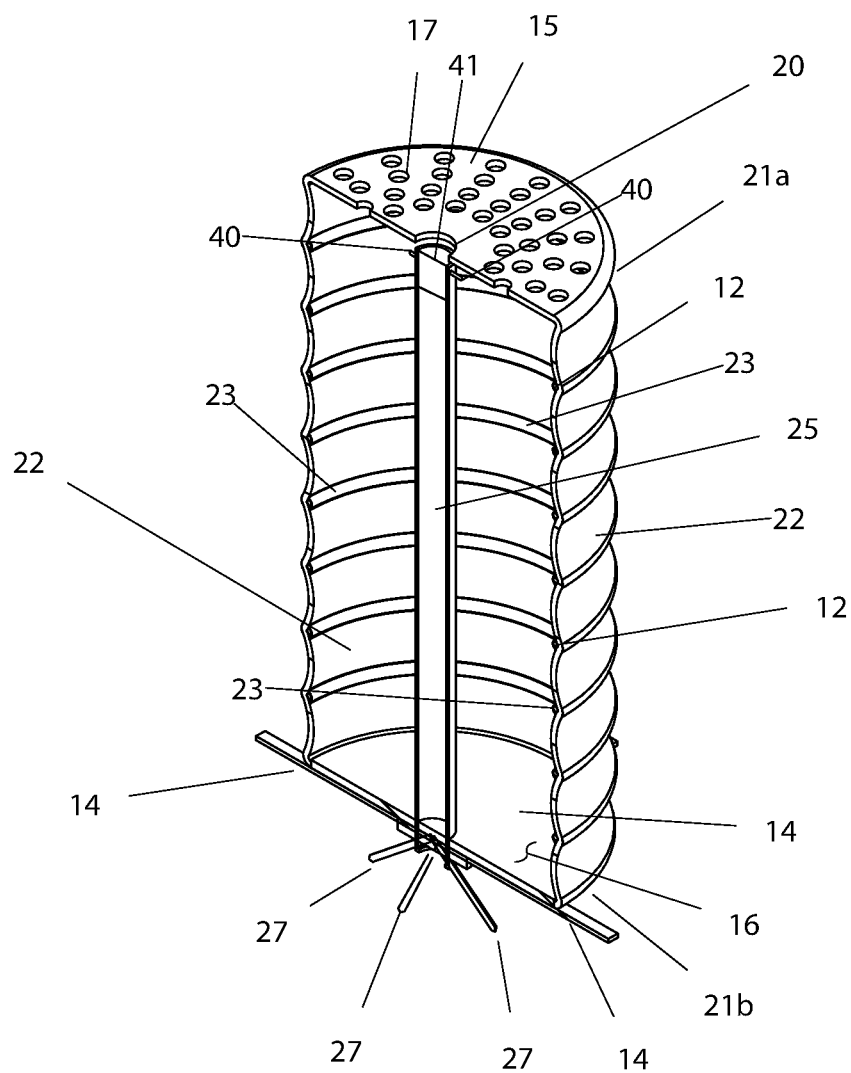
FIG. 2a is a front perspective cut-away view of the flower protector 10 of FIG. 1, according to the preferred embodiment of the present invention.
Figure 2B:
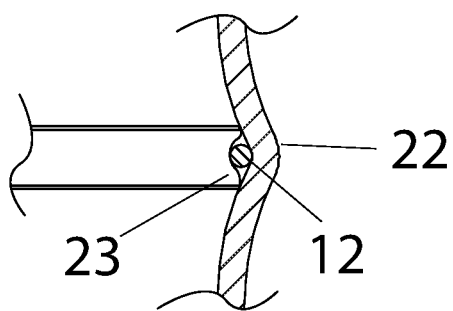
FIG. 2b is a partial cut-away view of the rib 12 and sleeve 23 portion of the sidewall 22 of the flower protector 10, according to the preferred embodiment of the present invention.
Figure 3:
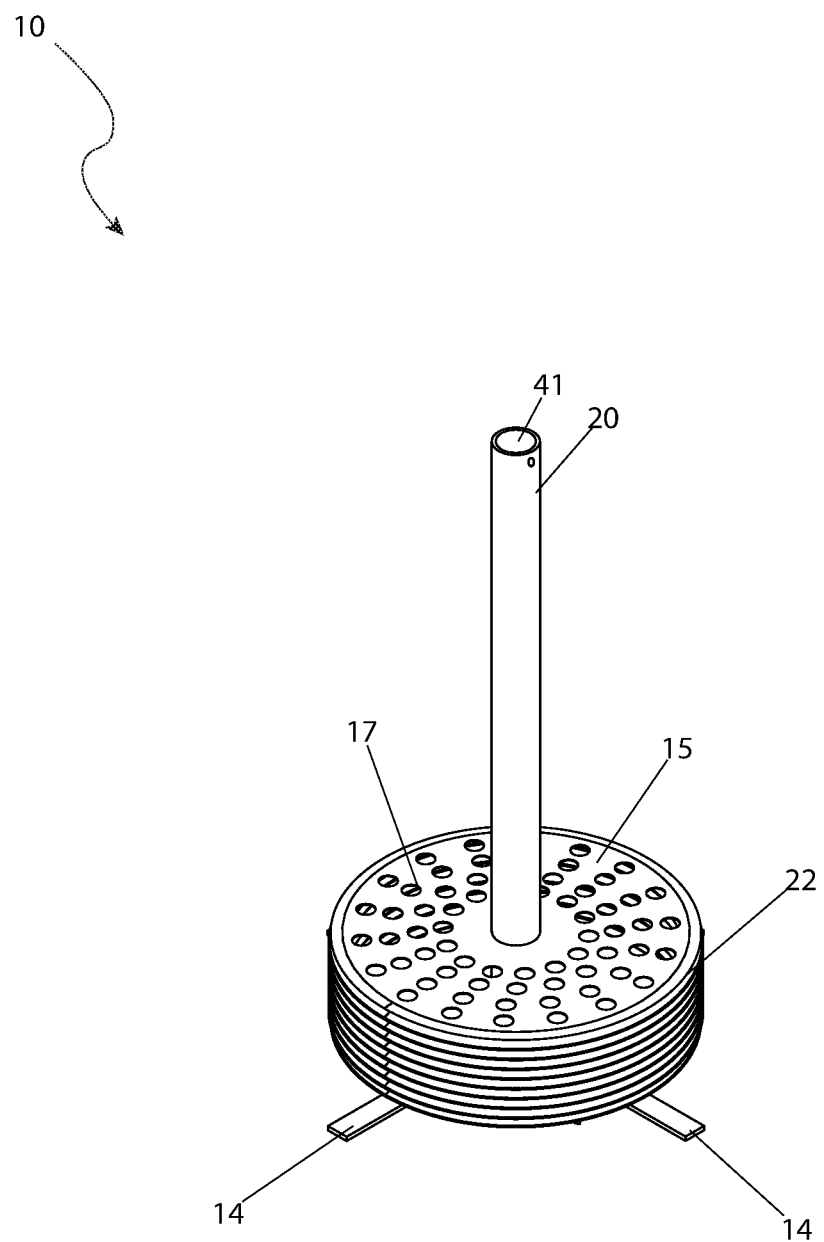
FIG. 3 is a front perspective view of the flower protector 10 in a fully collapsed configuration, according to the preferred embodiment of the present invention.

Referring now to FIGS. 1-3, various views of the protector 10 are herein described. The protector 10 includes a center post 25, typically cylindrical, and having a first end and a second end. A sidewall 22 having a plurality of ribs 12 circumscribes the center post 25 and is capable of full deployment (i.e., full expansion; please see FIG. 1) and full collapsing (i.e., full retraction please see FIG. 3) relative thereto.

Located at the first end of the center post 25 is a key receiver 20 that is keyed or otherwise has a locking mechanism 41 that is in mechanical communication with a pair of stops 40. The pair of stops 40 are preferably located adjacent the first end and project outwardly at diametrical opposing sides of the center post 24. When deployed, the stops 40 extend perpendicularly away from the center post 25. When retracted, they retract within the locking mechanism 41 within the center post 25. Providing an authorized deployment of the locking mechanism 41, and therefore the stops 40, is a key 30 (please see FIG. 5). Operation of the key 30 therefor provides selective and authorized deployment or retraction of the stops 40. The stops 40 prevent downward movement of the sidewall 12 relative to the center post 25.

Located at the second end of the center post 25 is a plurality of legs 27 arranged in a tripod. It is appreciated that any other number of legs 27 in any geometrical configuration, each with or without a pointed end to penetrate the ground surface, can be utilized, as long as the overall effect is to support the entire weight of the protector 10 when fully deployed in a balanced manner.

Extending away from diametrically opposing sides of the second end of the center post 25, immediately superjacent from the plurality of legs 27 is a lower frame 14. In a preferred embodiment, the lower frame 14 are four (4) identical cylindrical or rectangular frame members, preferably of the same or similar material of construction as the center post 25, and either affixed thereto or integral therewith. The individual members of the lower frame 14 extend perpendicularly away from the center post 25 and are coterminous with respect to length. Affixed to or attached to the members of the lower frame 14 is a lower perimeter frame 20b. The lower perimeter frame 20b is circular and circumscribes the center post 25.

Attached to or otherwise affixed to the lower perimeter frame 20b is a lower perimeter edge of the sidewall 22, configured to be cylindrical in shape and transparent. Attached to or otherwise affixed to the opposing upper perimeter edge of the sidewall 22 is an upper perimeter frame 20a, identical in material of construction and having a diameter coextensive with the lower perimeter frame 20b. The sidewall 22 is of a material enabling it to be relatively flexible, yet resilient enough to withstand extended periods exposed the environment. Interspersed within the sidewall 22 (as seen in FIG. 2) or attached to either the inner or outer surface of the sidewall 22, is a plurality of sleeves 23. Disposed within each sleeve 23 is a rib 12. The sleeves 23 may be permanently fastened to the sidewall 22 or have a removable fastener (e.g., hook-and-loop-type fastener) to removably fasten them to the sidewall 22. Additionally, the interior of each sleeve 23 may be accessible in the instance where the rib 12 needs to be removed or replaced. This can also be accomplished with a removable fastener. A preferred embodiment, shown more clearly in FIG. 2b, illustrates an individual sleeves 23 affixed to the inner side of the sidewall 22 and the rib 12 disposed therein.

The sleeves 23 and therefore the ribs 12 are envisioned to be equidistantly spaced between each other and the upper perimeter frame 20a and lower perimeter frame 20b. Each rib 12 may be a linear or elongated wire with fasteners at each end to enable it to be configured as a circle, preferably having a diameter coextensive with both the upper perimeter frame 20a and lower perimeter frame 20b, when inserted into the sleeve 23. When the sidewall 22 is fully retracted, it is expected that the upper perimeter frame 20a, plurality of ribs 12, and lower perimeter frame 20b are arranged in a stacked configuration, with the sidewall 22 bunched together. When fully extended and the stops 40 deployed, the sidewall 22 is fully extended between the upper perimeter frame 20a and lower perimeter frame 20b, with the plurality of ribs 12 providing rigidity and a cylindrical shape to the sidewall 22.

Attached, affixed to, or otherwise supported by the upper perimeter frame 20a, is a top wall 16. The top wall 16 may be a portion of the sidewall 22 or a separate piece, in which case it would have to be separately attached to the entire perimeter of the upper perimeter frame 20a. The top wall 16 spans the entire area between the upper perimeter frame 20a and is planar, except for a cut-out portion to enable the center post 25 to minimally protrude therefrom. The cut-out portion may have a reinforcing ring similar in size, shape, and material of construction as the upper perimeter frame 20a, lower perimeter frame 20b, bottom frame 14, and center post 25. It is this portion that the pair of stops 40 engages to restrict downward travel of the sidewall 22 when they are deployed. Once the sidewall 22 is fully extended, the key 30 engages the locking mechanism 41 to extend the stops 40 which will engage the inner surface of the top wall 16. Arranged in a random or desired pattern on the top wall 16 is a plurality of apertures 17 to provide access to the environment, which is especially necessary for flowers to be in contact with direct sunlight and precipitation. The bottom frame 14 extends from the lower perimeter frame 21b in a plus-shaped configuration for greater support.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A flower protector, comprising:
a center post having a first end and a second end;
a sidewall having a plurality of ribs that circumscribes the center post and is fully deployed and fully collapsed relative thereto;
a plurality of legs located at the second end of the center post;
a lower frame extending away from diametrically opposing sides of the second end of the center post, immediately superjacent from the legs;
a lower perimeter frame attached to the lower frame;
an upper perimeter frame attached to the opposing upper perimeter edge of the sidewall; and
a top wall having a plurality of apertures adapted to provide access to an external environment for one or more flowers to be in contact with direct sunlight and precipitation;
wherein each of the ribs are disposed within each of a plurality of sleeves;
wherein the sidewall is made of a flexible and resilient material;
wherein the sleeves have a removable fastener to removably fasten them to the sidewall;
wherein the removable fastener is a hook-and-loop-type fastener;
wherein the lower frame extends outward and beyond the lower perimeter frame in a plus-shaped configuration for greater support;
wherein each of the sleeves are affixed to the inner side of the sidewall and one of the ribs are disposed therein; and wherein when the lower frame is placed in direct contact with a surface and the sidewall is fully deployed, the center post is the only vertical post of the flower protector and the sidewall does not have any vertical support members.

2. The flower protector according to claim 1, wherein the center post is cylindrical.

3. The flower protector according to claim 1, wherein the sleeves are interspersed within the sidewall or are attached to an inner surface.

4. The flower protector according to claim 1, wherein the sleeves are interspersed within the sidewall or are attached to the outer surface of the sidewall.

5. The flower protector according to claim 1, wherein the legs are arranged in a tripod.

6. The flower protector according to claim 5, wherein the legs each include a pointed end to penetrate the ground surface.

7. The flower protector according to claim 1, wherein the lower perimeter frame is circular, transparent, and circumscribes the center post.

8. The flower protector according to claim 1, wherein the interior of each of the sleeves are accessible where one of the ribs needs to be removed or replaced.

9. The flower protector according to claim 1, wherein the interior of each of the sleeves are accessible with a removable fastener.

10. The flower protector according to claim 1, wherein the sleeves and the ribs are equidistantly spaced between each other and the upper perimeter frame and the lower perimeter frame.

* * * * *